(12) United States Patent
Kinugawa

(10) Patent No.: US 8,513,843 B2
(45) Date of Patent: Aug. 20, 2013

(54) INSULATING HOUSING FOR MOTOR TERMINAL

(75) Inventor: Hiroyuki Kinugawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 294 days.

(21) Appl. No.: 12/933,753

(22) PCT Filed: Apr. 2, 2009

(86) PCT No.: PCT/JP2009/001553
§ 371 (c)(1),
(2), (4) Date: Sep. 21, 2010

(87) PCT Pub. No.: WO2009/157119
PCT Pub. Date: Dec. 30, 2009

(65) Prior Publication Data
US 2011/0006626 A1    Jan. 13, 2011

(30) Foreign Application Priority Data

Jun. 23, 2008  (JP) .................................. 2008-163366

(51) Int. Cl.
*H02K 5/22* (2006.01)
(52) U.S. Cl.
USPC ............................................ 310/71; 310/43
(58) Field of Classification Search
USPC .......................................................... 310/71
See application file for complete search history.

(56) References Cited

U.S. PATENT DOCUMENTS

| | | | |
|---|---|---|---|
| 5,770,902 A * | 6/1998 | Batten et al. ..................... | 310/71 |
| 6,515,392 B2 | 2/2003 | Ooiwa | |
| 6,600,244 B2 * | 7/2003 | Okazaki et al. .................. | 310/71 |
| 6,914,356 B2 * | 7/2005 | Yamamura et al. .............. | 310/71 |
| 7,723,878 B2 | 5/2010 | Yagai et al. | |
| 2005/0269895 A1 * | 12/2005 | Innami et al. .................. | 310/218 |
| 2006/0068617 A1 * | 3/2006 | Migita et al. .................. | 439/76.2 |
| 2007/0205678 A1 * | 9/2007 | Takashima et al. ............. | 310/71 |
| 2007/0205679 A1 * | 9/2007 | Terauchi et al. ................ | 310/71 |
| 2007/0273221 A1 * | 11/2007 | Kinoshita et al. .............. | 310/58 |
| 2007/0278876 A1 * | 12/2007 | Haga et al. ...................... | 310/71 |
| 2008/0150377 A1 * | 6/2008 | Yamaguchi et al. ............ | 310/71 |

FOREIGN PATENT DOCUMENTS

| | | | |
|---|---|---|---|
| JP | 2000-224801 | A | 8/2000 |
| JP | 2002-171732 | A | 6/2002 |
| JP | 2002-315248 | A | 10/2002 |
| JP | 2003-174750 | A | 6/2003 |
| JP | 3613262 | B2 | 1/2005 |
| JP | 2006-187175 | A | 7/2006 |
| JP | 2008-79467 | A | 4/2008 |

* cited by examiner

*Primary Examiner* — Burton Mullins
(74) *Attorney, Agent, or Firm* — Birch, Stewart, Kolasch & Birch, LLP.

(57) ABSTRACT

An insulating housing for a motor terminal includes a plurality of electricity supply members each having a connector terminal for connection to a power supply and a coil terminal to which a motor coil is connected; and an insulating housing main body for insulating the plurality of electricity supply members from each other and holding the electricity supply members. The insulating housing main body integral with the electricity supply members is formed by insert-molding with the plurality of electricity supply members spaced in an insulating interval from each other and disposed on the same plane after bending, then the connector terminal is protruded within a connector insertion opening formed integral with the insulating housing main body, and the coil terminal is protruded onto the same plane as the peripheral surface of the insulating housing main body.

4 Claims, 5 Drawing Sheets

INSULATING HOUSING FOR MOTOR TERMINAL

TECHNICAL FIELD

The present invention relates to an insulating housing for a motor terminal, and more particularly to an insulating housing for a motor terminal that includes an electricity supply member for performing an electricity supply to a motor coil.

BACKGROUND ART

This type of insulating housing for a motor terminal is conventionally arranged, as shown in Patent Document 1, such that a housing main body houses in a housing groove thereof electricity supply members for the respective phases of a motor, each forming a ring having a plurality of lead line connectors, and insulating members, with the electric electricity supply members and the insulating members placed in an alternately superposed relation.

Patent Document 1: JP-A-2000-224801

The conventional insulating housing for a motor terminal has the following problems since the electric electricity supply members for the respective phases of a motor each form a ring having a plurality of lead line connectors, as described above:

1) The insulating housing is extremely uneconomical because of low material yield in the production of the electricity supply members.

2) The electricity supply members for the respective phases and the insulating members, each forming a ring, are housed in the housing groove of the housing main body with the electricity supply members and the insulating members placed in an alternately superposed relation, in other words, with an insulating distance vertically put in every space between the electricity supply members, and thus the housing main body becomes large in thickness to increase the size thereof in the assembling direction of the main body to a motor.

3) Placing the electricity supply members and the insulating members in an alternately superposed relation increases the depth of a metal mold, and thus it is difficult to place insert components therein upon a molding process.

4) The number of lead wire connectors of each of the electricity supply members of the respective phases is large. Thus, the number of lead wire connectors projecting from the housing main body is large, and the number of assembling steps to connect the lead wire connectors to motor coils is large to increase difficulty in assembly.

The present invention has been made to solve the above-mentioned problems, and an object of the present invention is to provide an insulating housing for a motor terminal, which is small in size and easy to fabricate since the shape of the electricity supply member thereof is simplified to enable the material yield to be improved.

DISCLOSURE OF THE INVENTION

The insulating housing for a motor terminal according to the present invention includes a plurality of electricity supply members each having a connector terminal for connection to a power supply and a coil terminal to which a motor coil is connected; and an insulating housing main body for insulating the plurality of electricity supply members from each other and holding the electricity supply members, wherein insert-molding is performed, with the plurality of electricity supply members disposed spaced in an insulating interval from each other on the same plane, to thereby form the insulating housing main body integral with the plurality of electricity supply members, the connector terminal is bent to be protruded within a power supply connector insertion opening formed integral with the insulating housing main body, and the coil terminal is protruded onto the same plane as the peripheral surface of the insulating housing main body.

According to the present invention, insert-molding is performed under a condition where the plurality of electricity supply members each having the connector terminal and the coil terminal are disposed spaced in an insulating interval from each other on the same plane. Therefore, placing those components in a superposed manner as in the past is not required, and the insulating housing for a motor terminal can be formed in a thinner shape in a vertical direction, more specifically, in a shape reduced in thickness, thus enabling the entire motor to be produced in a thin shape. Further, due to formation of the electricity supply member in a straight or curved shape, the material yield in forming the electricity supply member from plate a material is increased. Furthermore, when the insulating housing for a motor terminal is assembled to a motor having motor coils of the respective phases wound thereon in series, the maximum number of the coil terminals to be protruded from the insulating housing main body can be six in the case of the motor coils connected in a Y-connection and the maximum number thereof can be three in the case of the motor coils connected in a delta-connection. Thus, the number of coil terminals to be protruded therefrom can be reduced. Consequently, it is possible to reduce the diameter of the insulating housing main body, and in combination with the above points, it is possible to downsize the configuration of the insulating housing main body, and also the number of the coil terminals to be connected is reduced, thus enabling the assembling work to be carried out with simplicity and rapidity.

BEST MODE FOR CARRYING OUT THE INVENTION

Embodiments of the present invention will now be described with reference to the accompanying drawings in order to explain the present invention in more detail.

First Embodiment

Figure 1:
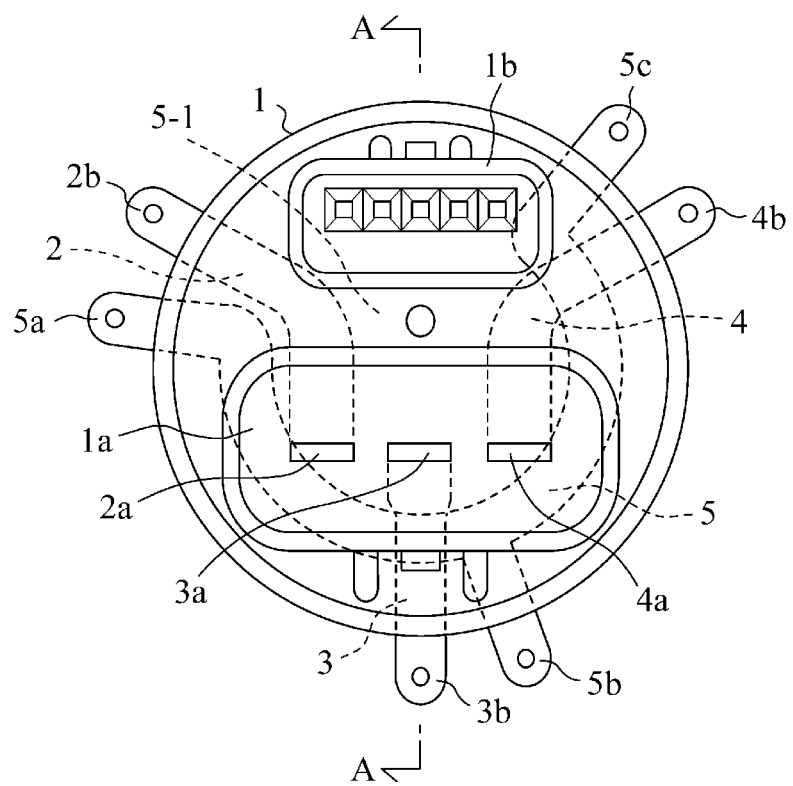
FIG. 1 is a plan view showing an insulating housing for a motor terminal in accordance with the first embodiment.
Figure 2:
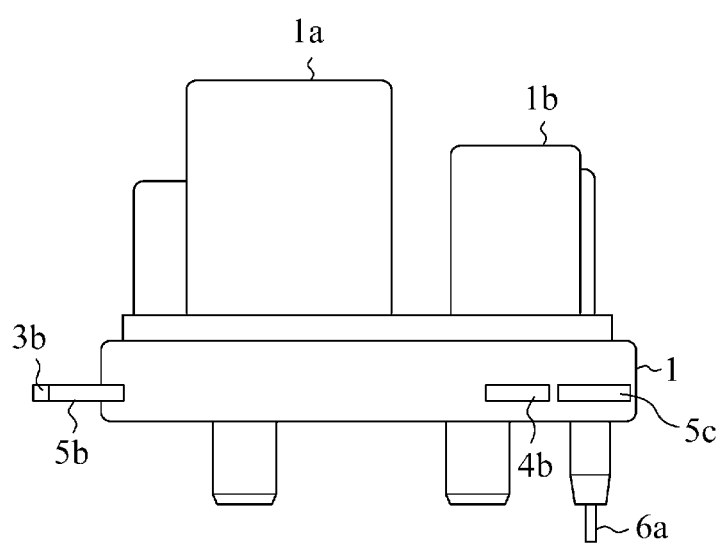
FIG. 2 is a front view of FIG. 1.
Figure 3:
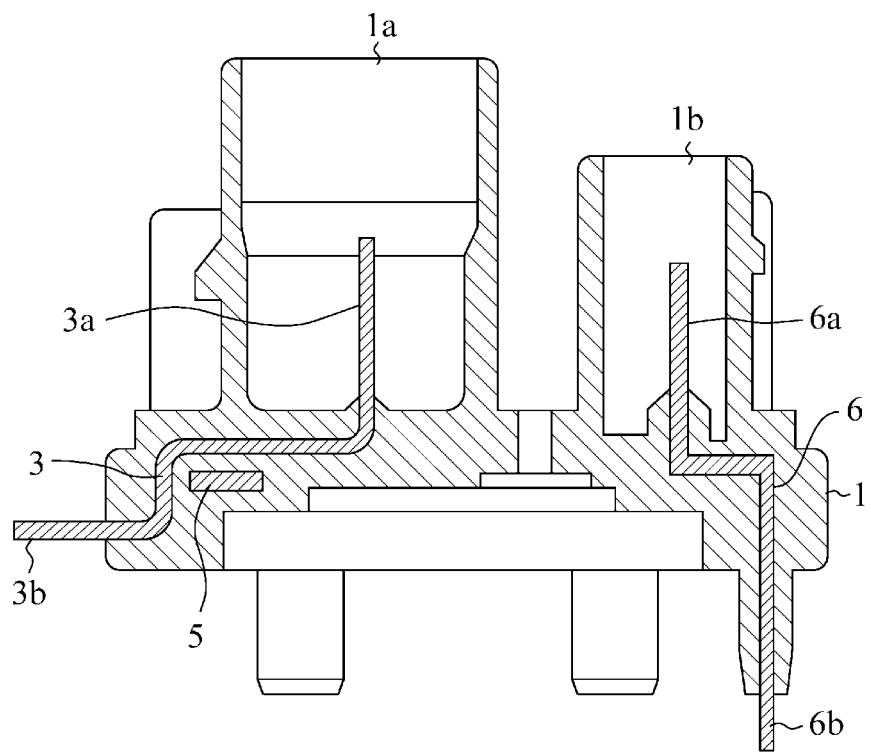
FIG. 3 is a longitudinal sectional view along the line A-A of FIG. 1.
Figure 4:
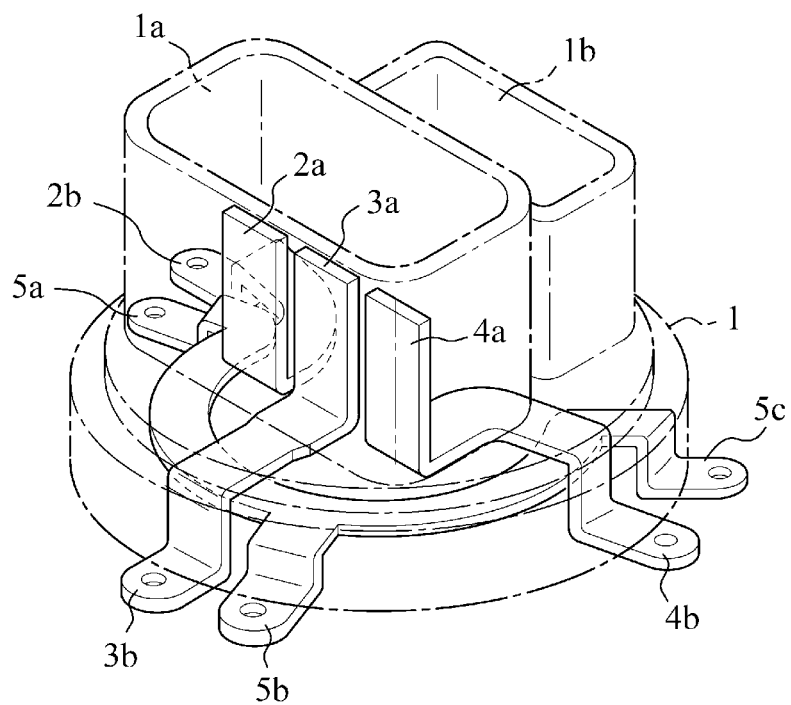
FIG. 4 is an perspective view showing a relation between electricity supply members and a common terminal.
Figure 5:
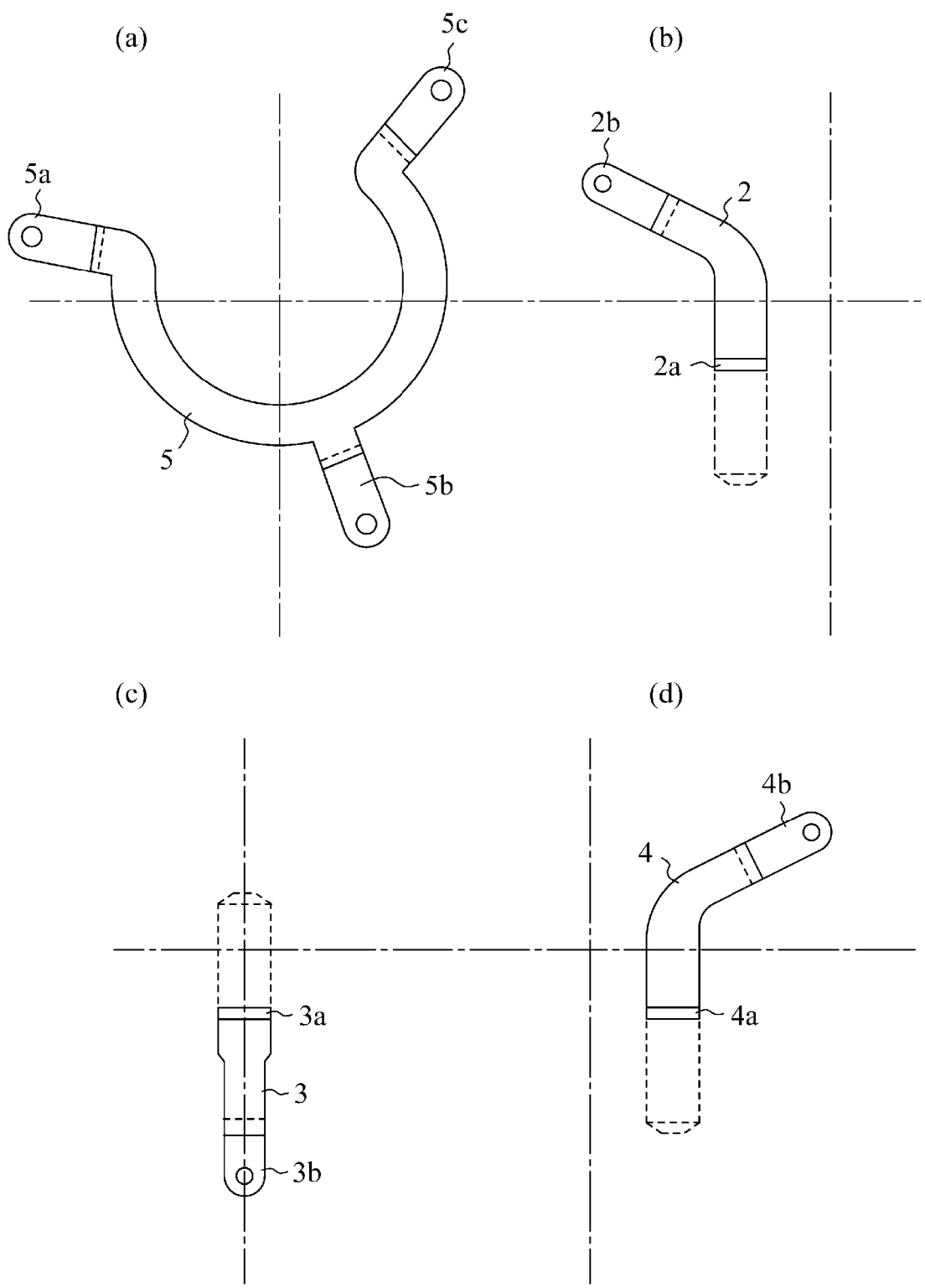
FIG. 5 is a plan view showing the electricity supply members and the common terminal.

FIG. 1 is a plan view showing an insulating housing for a motor terminal according to the present invention, FIG. 2 is a plan view thereof, FIG. 3 is a longitudinal sectional view along the line A-A of FIG. 1, FIG. 4 is an perspective view showing the relative dispositions of electricity supply members of the respective phases and common terminals, and FIG. 5 is a plan view showing the electricity supply members of the respective phases and the common terminals.

A housing main body 1 made of a resin holds a plurality of electricity supply members 2-4 having connector terminals 2a-4a each for connection to a power supply, respectively, and having coil terminals 2b, 3b, 4b, respectively, for connection to motor coils 9U, 9V, 9W, respectively, and a common terminal member 5 having common terminals 5a-5c for connecting one ends of the coil terminals to each other, with the electricity supply members and the common terminal member insulated from each other.

The electricity supply members 2-4 are formed by stamping a plate of a conductive metal (e.g., cupper) into a straight or curved, narrow piece of special shape as shown in FIG. 5, and the common terminal member 5 is formed by stamping a plate into a generally horseshoe shape while forming protrusions at both the ends and the middle portion thereof. Under a condition where the plurality of electricity supply members 2-4 are disposed spaced in an insulating interval from each other on the same plane and also the common terminal member 5 is superposed above the plurality of electricity supply members 2-4 with the common terminal member spaced in an insulating interval from the electricity supply members, the electricity supply members and the common terminal member are integrally formed by insert-molding. Then, as shown in FIG. 4, the connector terminals 2a-4a formed on the electricity supply members 2-4 are bent to be protruded within a power supply connector insertion opening 1a formed integral with the insulating housing main body 1. Further, the coil terminals 2b, 3b, 4b formed on the electricity supply members 2-4 and the common terminals 5a-5c formed on the common terminal member 5 are protruded onto the same plane as the peripheral surface of the insulating housing main body 1.

A plurality of signal supply members 6 each having a signal terminal 6a for connection to a signal detecting terminal and a sensor terminal 6b to which a sensor is connected (the sensor is a sensor located on the motor side, and is not shown.) have been integrated together with other components into the single structural member by the insert-molding, under a condition where the signal supply members are disposed at a position where the signal supply members do not act on the electricity supply member 2-4 and the common terminal member 5, more specifically, at a blank portion 5-1 of the horseshoe shape of the common terminal member 5 where the electricity supply members 2-4 are not present, thereafter the signal terminals 6a is protruded within a signal connector insertion opening 1b formed integral with the insulating housing main body 1, and the sensor terminals 6b is protruded in an assembling direction of the insulating housing main body 1 to the motor.

Figure 6:
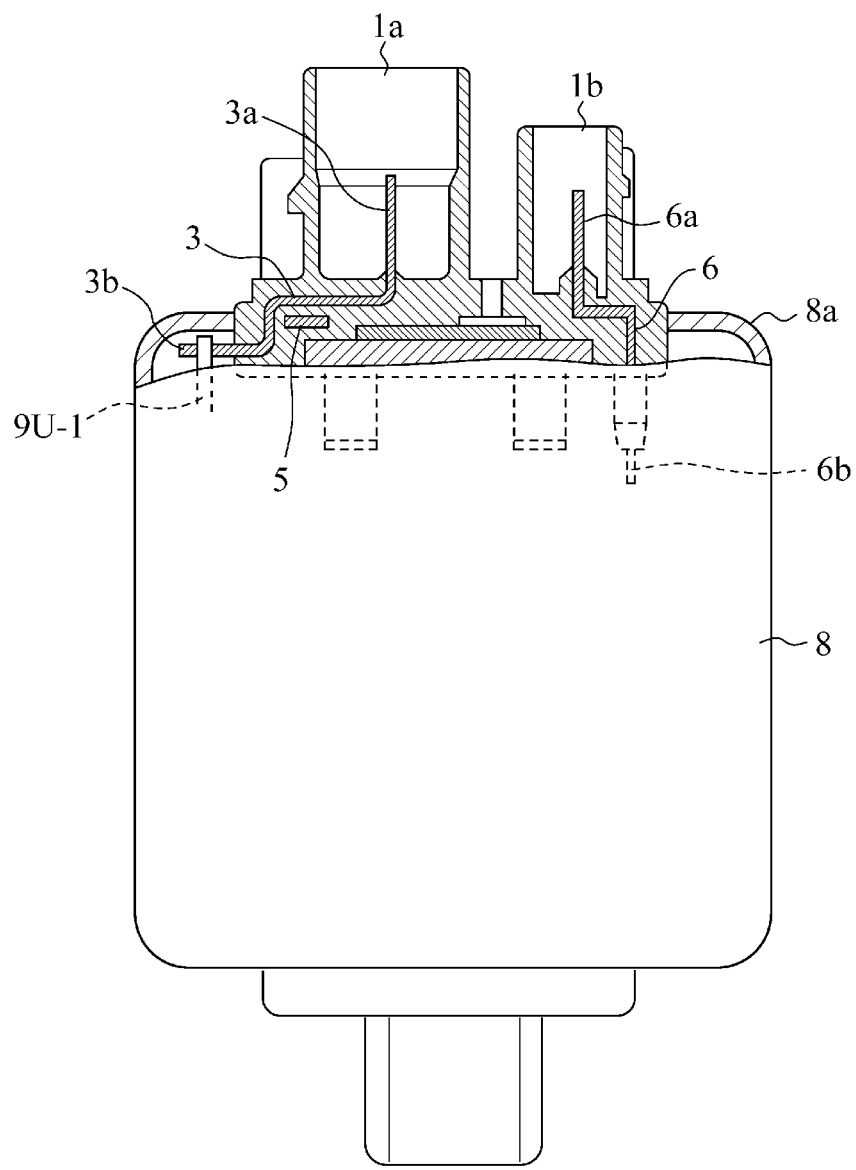
FIG. 6 is a partially cutaway front view showing a state where the insulating housing for a motor terminal in accordance with the first embodiment is assembled to a motor.
Figure 7:
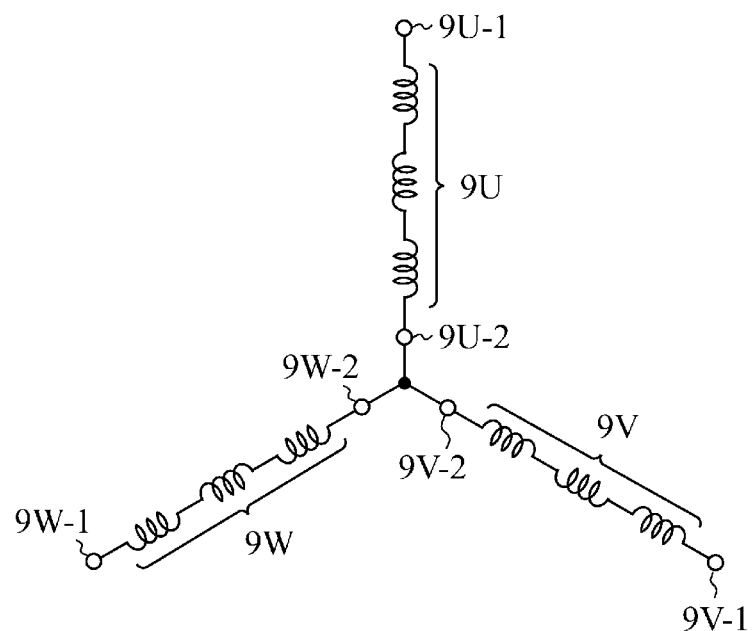
FIG. 7 is a schematic view showing motor coils connected in a Y-connection.

The insulating housing for a motor terminal in accordance with the first embodiment is arranged as discussed above, and thus the insulating housing therefor is inserted and assembled in a housing 8a of a motor 8 from the side thereof from which the sensor terminal 6b projects as shown in FIG. 6. In this case, as shown in FIG. 7, each of respective phase coils 9U, 9V, 9W of the motor 8 is wound in series with the winding direction reversed with respect to the adjoining magnetic poles, and the phase coils 9U, 9V, 9W are connected to the coil terminals 2b, 3b, 4b, and the common terminals 5a-5c, respectively.

To be more exact, one ends 9U-1, 9V-1, 9W-1 of the respective phase coils 9U, 9V, 9W are connected with the coil terminals 2b, 3b, 4b, respectively, and the other one ends 9U-2, 9V-2, 9W-2 of the respective phase coils 9U, 9V, 9W are connected to the common terminals 5a-5c, respectively. As a result, the coils 9U, 9V, 9W of the motor 8 are connected in a Y-connection, and electric power supplied to the connector terminals 2a-4a from an external power source (not shown) flows from the coil terminals 2b, 3b, 4b through the respective phase coils 9U, 9V, 9W of the motor 8 and the common terminals 5a-5c to drive the motor 8. It should be appreciated that the above-discussed arrangement provides a 9-slot, 6-pole motor.

In accordance with the embodiment described above, the plurality of electricity supply members each having the connector terminal and the coil terminal are insert-molded into a single structural body with the electricity supply members disposed spaced in an insulating interval from each other on the same plane. Thus, the plurality of electricity supply members do not require to be stacked as in the conventional, and the insulating housing for a motor terminal can be formed thinly in a vertical direction, namely, in thickness, thus enabling the overall thickness of a motor to be reduced.

Forming the electricity supply members in a straight or curved shape improves the material yield when the electricity supply members are formed from a plate material. Moreover, when the insulating housing for a motor terminal is assembled to a three-phase motor having motor coils of the respective phases wound in series thereon, the maximum number of the coil terminals to be protruded from the insulating housing main body can be six in the case of motor coils connected in a Y-connection, and the maximum number thereof can be three in the case of motor coils connected in a delta-connection. That is, the maximum number of coil terminals can be six. Thus, the number of coil terminals to be protruded therefrom can be reduced. As a consequence, it is possible to reduce the diameter of the insulating housing main body; in combination with the above points, it is possible to downsized the configuration of the insulating housing main body, and also the number of times the coil terminals are connected becomes fewer, thus enabling the assembling work to be carried out with simplicity and rapidity.

Further, the plurality of signal supply members 6 each having the signal terminal 6a for connection to the signal detecting terminal and the sensor terminal 6b for connection to the sensor (the sensor is one located on the motor side, and is not shown.) can be disposed at a position where the signal supply members do not act on the electricity supply member 2-4 and the common terminal member 5, more specifically, at the blank portion 5-1 of the horseshoe shape of the common terminal member 5 that is not provided with the electricity supply members 2-4 within the housing main body 1. Therefore, the signal supply members can be disposed on the same plane as the electricity supply members 2-4, thus enabling the sensor connector to be disposed without increasing the size in the stacking direction, and moreover enabling the housing main body 1 to be further reduced in diameter. Consequently, the whole configuration of the insulation housing can be downsized.

Second Embodiment

Figure 8:
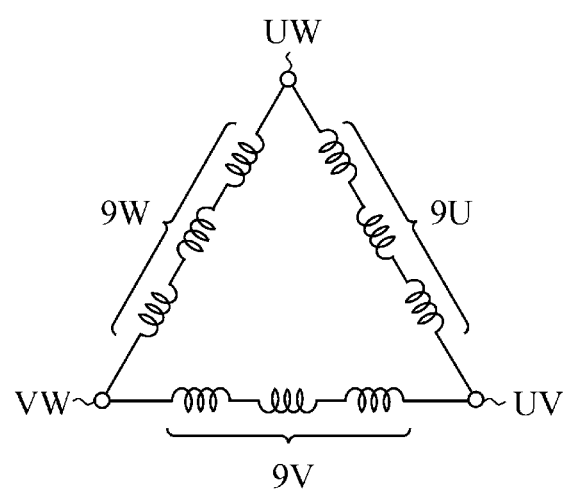
FIG. 8 is a schematic view showing motor coils connected in a delta-connection.

In an insulating housing for a motor terminal in accordance with the second embodiment, when the respective phase coils 9U, 9V, 9W of a motor 8 are connected in a delta-connection as shown in FIG. 8, it is essential only that the coil terminals of the adjoining phases be connected to each other and the connecting points UW, UV, VW be connected to the coil terminals 2b, 3b, 4b, respectively. Thus, the common terminal member 5 in the first embodiment becomes unnecessary. Therefore, the insulating housing for a motor terminal in accordance with the second embodiment has a structure having the common terminal member 5 removed from FIG. 1-FIG. 6 shown above. Thus, the structure thereof is not shown.

For this reason, the electricity supply members only have to be integrated into a single structural body by insert-molding under a condition where a plurality of electricity supply members 2-4 are disposed spaced in an insulating distance from each other on the same plane. As a result, the number of layers of insulating members to be formed by insert-molding becomes one, the insulating housing main body can be formed in a thinner shape, and also the number of coil terminals to be protruded onto the peripheral surface of the insulating housing main body is reduced by one-half, thus enabling the reduction in thickness and size of the entire structure of the insulating housing for a motor terminal to be achieved.

INDUSTRIAL APPLICABILITY

As discussed above, the insulating housing for a motor terminal according to the present invention simplifies the shape of an electricity supply member in a motor and enables the material yield to be improved. In order to provide an insulating housing for a motor terminal that is small in size and easy to fabricate, the insulating housing includes a plurality of electricity supply members each having a connector terminal for connection to a power supply and a coil terminal for connection with a motor coil, and an insulating housing main body for insulating the plurality of electricity supply members from each other and holding the electricity supply members. The insulating housing therefor is further characterized in that insert-molding is performed, with the plurality of electricity supply members disposed spaced in an insulating interval from each other on the same plane, to thereby form the insulating housing main body integral with the plurality of electricity supply members, then the connector terminals are bent to be protruded within a power supply connector insertion opening formed integral the insulating housing main body, and the coil terminal is protruded onto the same plane as the peripheral surface of the insulating housing main body. Thus, the insulating housing is suitable for use in an insulating housing for a motor terminal that includes an electricity supply member for supplying power to a motor coil, or the equivalent.

The invention claimed is:

1. An insulating housing for a motor terminal comprising:
a plurality of electricity supply members each having a connector terminal for connection to a power supply and a coil terminal to which a motor coil is connected; and
an insulating housing main body for insulating the plurality of electricity supply members from each other and holding the electricity supply members; and
a signal supply member having a signal terminal for connection to a signal detection terminal and a sensor terminal to which a sensor is connected,
wherein insert-molding is performed, with the plurality of electricity supply members disposed spaced in an insulating interval from each other on the same plane and the signal supply member disposed at a position where the signal supply member does not act on the electricity supply members, to thereby form the insulating housing main body integral with the plurality of electricity supply members and the signal supply member,
the signal terminal is bent to be protruded within a signal connector insertion opening formed integral with the insulating housing main body,
the sensor terminal is protruded in an assembling direction of the insulating housing main body to a motor,
the connector terminal is bent to be protruded within a power supply connector insertion opening formed integral with the insulating housing main body, and
the coil terminal is protruded onto the same plane as the peripheral surface of the insulating housing main body.

2. The insulating housing for a motor terminal according to claim 1, wherein a coil of each of the respective phases of a motor is wound in series with the winding direction reversed with respect to the adjoining magnetic poles, the winding beginning end of each of the coils of the respective phases and the winding ending end of the adjoining coil are connected with each other in succession, and the connected ends are further connected to the respective coil terminals to connect the coils in a delta-connection.

3. An insulating housing for a motor terminal comprising:
a plurality of electricity supply members each having a connector terminal for connection to a power supply and a coil terminal to which a motor coil is connected;
a common terminal member having a plurality of common terminals to which the motor coils are connected; and
an insulating housing main body for insulating the plurality of electricity supply members and the common terminal member from each other to be held,
wherein the insulating housing further includes a signal supply member having a signal terminal for connection to a signal detection terminal and a sensor terminal to which a sensor is connected,
wherein insert-molding is performed under a condition where the plurality of the electricity supply members are disposed spaced in an insulating interval from each other on the same plane and also the common terminal member is superposed above the plurality of electricity supply members with the common terminal member spaced in an insulating interval from the plurality of electricity supply members, and with the supply member disposed at a position where the signal supply member does not act on the electricity supply members and the common terminal member, to thereby form the insulating housing main body integral with the plurality of electricity supply members, the common terminal member, and the signal supply member,
the signal terminal is protruded within a signal connector insertion opening formed integral with the insulating housing main body,
the sensor terminal is protruded in an assembling direction of the insulating housing main body to a motor,
the connector terminals are bent to be protruded within a power supply connector insertion opening formed integral the insulating housing main body, and
the coil terminals of the plurality of electricity supply members and the common terminals of the common terminal member are protruded onto the same plane as the peripheral surface of the insulating housing main body.

4. The insulating housing for a motor terminal according to claim 3, wherein a coil of each of the respective phases of a motor is wound in series with the winding direction reversed with respect to the adjoining magnetic poles,
one ends of the coils of the respective phases are connected to the respective coil terminals of the electricity supply member, and the other one ends of the coils of the respective phases are connected to the respective common terminals of the common terminal member to connect the coils in a Y-connection.

\* \* \* \* \*